Dec. 17, 1968     U. W. AUER     3,416,823

HEAT SHRINKABLE LOCKING MEMBER FOR A FASTENER

Filed Aug. 16, 1966

3,416,823
HEAT SHRINKABLE LOCKING MEMBER
FOR A FASTENER
Ulrich Wolfgang Auer, 5 Ave. de Cavaliers,
1224 Chene-Bougeries, Geneva, Switzerland
Filed Aug. 16, 1966, Ser. No. 572,787
Claims priority, application Germany, Aug. 16, 1965,
A 50,006
6 Claims. (Cl. 287—189.36)

ABSTRACT OF THE DISCLOSURE

A joint for the connection of members to be joined comprising a bolt which passes through an opening in the members to be joined and a heat shrinkable member initially mounted on the bolt with clearance and having a dish-shape such that upon heating it shrinks tightly onto the bolt while also shrinking axially to clamp the members to be joined against the head of the bolt.

---

Figure 1:
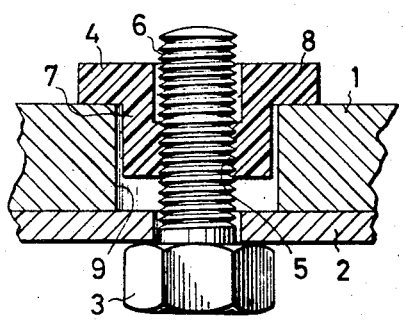

The invention is directed to a fastener of the type including a bolt and in particular to a holding element which becomes secured on the bolt by engaging the circumferential surface of the bolt, the holding element having for this purpose a bore in which the bolt can be inserted.

More specifically, the holding element is a nut of specific material which is placed on a threaded bolt and which shrinks after heating, to be secured on the bolt.

Threaded joints are frequently used for assembling machines, apparatus and tools of all kinds because it is thus possible to subsequently disassemble the joined parts for repairs, adjustment and the like.

In recent years plastic nuts have been frequently used, since they offer advantages, such as greater resistance against loosening in the case of vibrations, electrical insulation properties, lower weight and economical production.

Self-locking nuts, however, have the disadvantage that the assembly takes much time and the machines for an automatic assembly are rather complicated in series production.

An object of the invention is to facilitate the assembly of self-locking nuts and to simplify the machines for progressive and automatic assembly and save much time in such assembly, while retaining all the advantages of the known nuts, i.e., the possibility of disassembly with reuse of the elements, the adjustability of the assembled parts, etc.

According to the invention the holding element, preferably a nut, consists of known shrinkable material. Its inside diameter is initially somewhat larger than the outside diameter of the bolt, preferably a corresponding conventional screw. It is thus not initially screwed on the screw, but simply slidably fitted thereon. By the supply of heat, for example, by means of a blower, the holding element can be caused to shrink and be deformably fitted on the screw so that the nut can be subsequently unscrewed from the screw as any other nut.

The nut material is preferably a cross-linked polymer which has been expanded at elevated temperature and which was cooled in the expanded state. Such material will then undergo shrinkage upon subsequent heating.

Suitable correspondingly treated plastics are, for example, distributed by the United States firm of Raychem Corporation. Such a plastic is, for example, a product supplied by this company under the name "Kynar," which has a polyvinylidene fluoride base. But other plastics, for example, polyvinyl chloride, can also be made shrinkable by a corresponding treatment.

If the joint according to the invention is to be self-locking, this can be achieved by forming a collar on the nut at an axial distance from the portion to be shrunk on the bolt in order to develop a clamping force between the collar and the head of the bolt due to axial shrinkage after heating of the nut.

This way the nut is not only shrunk on the bolt as a result of the heating, but it also compresses the joined parts. Naturally the collar must be farther away from the joined parts than the portion of the nut shrunk on the bolt.

Figure 2:
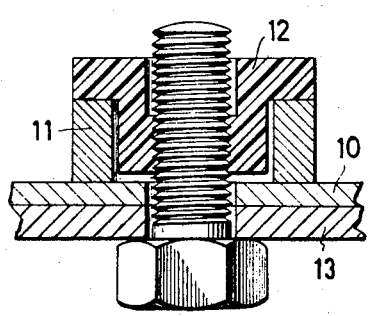
Figure 3:
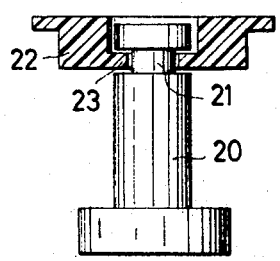
Figure 4:
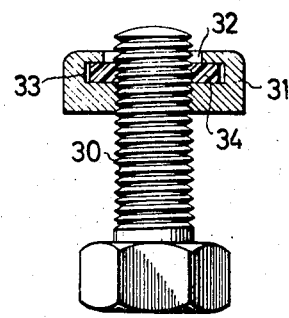

The invention will be described more fully with reference to the embodiments illustrated in the attached drawing:

FIGURES 1 and 2 show in side sectional view two embodiments of a bolted joint according to the invention; and FIGURES 3 and 4 show in side sectional view two bolt-holding element arrangements.

In the construction shown in FIG. 1, two plates 1 and 2 are held together by means of a screw 3 and a nut 4 designed according to the invention. The nut 4 extends into a large bore 9 of the plate 1. The bore 5 of the nut is shrunk on the threads 6 of the screw 3, but initially the bore is smooth before shrinkage. Its inside diameter is initially somewhat larger than the outside diameter of the screw thread. A web 7 connects a flange or collar 8 with that portion containing the bore 5 which is shrunk on the thread. When the nut is placed on the bolt and heated, the nut contracts radially and axially and engages not only the threads 6, but compresses at the same time the plates 1, 2.

FIG. 2 shows an assembly when there is no room for inserting the nut 12 into the parts 10 and 13 to be joined to each other. As can be seen from FIG. 2 a non-shrinking bushing 11 is placed under the nut so that the parts 10 and 13 to be joined are compressed during the shrinkage.

FIG. 3 shows a construction which is in principle similar to FIGS. 1 and 2, with the exception that the screw is replaced by smooth bolt 20 with a single annular slot 21 into which an inner collar 23 of disk 22 enters when the disk 22 shrinks. The function of the disk 22 is the same as that of the nuts 4 and 12.

The construction shown in FIG. 4 employs a conventional screw 30 with a nut 31 of non-shrinking material. In the upper half of the nut is provided a recess 32 with an inner groove 33 into which is inserted an annular disk 34 of shrinkable material. After the nut has been screwed on the screw 30, it is heated, to cause the disk 34 to shrink tightly about the threads of the screw whereby the disk thus prevents loosening of the nut and therefore serves as a locking means.

In summary, there has been shown herein a nut which is composed of material initially in a pre-stressed state so that when the nut is applied to a fastener and heated the nut will be caused to be shrunk on the fastener. Additionally, the nut can be caused to shrink in the axial direction to apply with the fastener a clamping force on the material to be joined.

Numerous modifications and variations of the disclosed invention will now become apparent to those skilled in the art without departing from the scope and spirit of the invention if defined by the attached claims.

What is claimed is:

1. In combination, a bolt and a holding element cooperating with the bolt to effect a bolted connection of members to be joined, said bolt passing through the members to be joined, said bolt having a head, and an axial shank provided with at least one circumferential groove, said holding element being engaged in said groove, said holding element being constituted of a heat shrinkable plastic material which has been radially and axially expanded at elevated temperature and cooled in the expanded state and having a central bore which in unshrunken state is larger than the outer diameter of the shank of the bolt and in shrunken state is smaller than the outer diameter of said shank, said holding element being of hollow dish-shape with a bottom portion containing said bore and a rim axially spaced from said bottom portion whereby upon radial and axial shrinkage of the holding element, the rim of the holding element is capable of exerting aixal force on the parts to be connected to clamp the same against the head of the bolt.

2. The combination as claimed in claim 1 wherein the shank has a threaded portion, said plastic material engaging the threaded portion upon shrinking and undergoing deformation to form internal threads so that said body can be screwed on and off the fastener.

3. The combination as claimed in claim 1 wherein said bottom portion of the holding element is disposed between the head of the bolt and said rim.

4. The combination as claimed in claim 1 wherein said rim is in direct engagement with one of the members to be joined.

5. The combination as claimed in claim 1, comprising a nonshrinking bushing between said rim and one of the members to be joined.

6. The combination as claimed in claim 1, wherein said holding element comprises a portion between said bottom portion and said rim having axial extent and undergoing shrinkage upon heating

References Cited

UNITED STATES PATENTS

| | | | |
|---|---|---|---|
| 1,016,746 | 2/1912 | Herzog | 151—14.5 |
| 1,978,229 | 10/1934 | Sass et al. | 85—32 |
| 2,445,172 | 7/1948 | Gravinese et al. | 151—14.5 |
| 2,894,426 | 7/1959 | Rapata | 85—36 |
| 2,802,503 | 8/1957 | Zupa | 151—7 |
| 2,960,902 | 11/1960 | Caro | 85—36 |
| 2,992,457 | 7/1961 | Harrison | 264—230 |
| 3,313,017 | 4/1967 | Zingali | 264—230 |

FOREIGN PATENTS 824,012   11/1959   Great Britain.

OTHER REFERENCES

IBM Technical Disclosure Bulletin, vol. 9, No. 3, August 1966, pp. 311, 312.

EDWARD C. ALLEN, *Primary Examiner.*

U.S. Cl. X.R.

85—32; 151—7